United States Patent [19]

Garrison et al.

[11] 3,748,378

[45] July 24, 1973

[54] FLAT PANEL VIDEO DISPLAY DEVICE

[75] Inventors: Arthur D. Garrison; Earl L. Hall, both of Fort Worth, Tex.

[73] Assignee: Stromberg-Carlson Corporation, Rochester, N.Y.

[22] Filed: Dec. 30, 1971

[21] Appl. No.: 214,198

[52] U.S. Cl. .......................... 178/5.4 R, 178/7.3 D

[51] Int. Cl. .......................................... H04n 9/12

[58] Field of Search ..................... 178/7.3 D, 5.4 R, 178/5.4 EL

[56] References Cited

UNITED STATES PATENTS

| | | | |
|---|---|---|---|
| 3,601,532 | 8/1971 | Bitzer et al. | 178/7.3 D |
| 2,976,360 | 3/1961 | Riddle | 178/7.3 D |
| 3,532,809 | 10/1970 | Witmer | 178/7.3 D |

*Primary Examiner*—Richard Murray
*Attorney*—Charles C. Krawczyk

[57] ABSTRACT

A flat panel video display device utilizes the normal glow discharge characteristics of gases to perform the switching functions for sequentially sampling and storing and then displaying the video signal. The device consists of a flat, sealed envelope which contains therein chambers filled with an ionizable gas and the signal sampling and storage circuits, horizontal line switching circuits, and a display matrix of light emitting elements.

18 Claims, 5 Drawing Figures

FLAT PANEL VIDEO DISPLAY DEVICE

BACKGROUND OF THE INVENTION

The present invention relates generally to devices for reproducing images from video signals and, in particular, to a flat panel video display device.

A flat panel video display device has a structure such that the depth of the device is much smaller than the viewing area so that the device could easily be mounted on a wall, for instance This is not a novel idea in itself. Uses and applications for such a device have long been apparent to many people. Extensive effort and talent have been devoted toward perfecting such a device which is practical and economical. This work has progressed for numerous years and several devices directed toward this desired goal have been evolved. All solutions to date have been found to exhibit inherent disadvantages which continue to impede development of the optimum device.

One solution, as disclosed in a patent entitled, "Flat Screen Television Display Apparatus" U.S. Pat. No. (3,379,831), utilizes incandescent lamps in a matrix array with individual control of each vertical and horizontal line contained in the matrix. The incoming video signal is sampled sequentially such that a sample is taken for each vertical line. Circuits associated with the vertical lines utilize the signal samples to generate pulse-width modulated signals, i.e., a constant amplitude signal with a width proportional to the level of the incoming video signal. These pulse-width modulated signals determine the period of illumination for each lamp connected to the activated horizontal line and the vertical lines. This sequential sampling operation is repeated for each horizontal line in the matrix.

One major disadvantage of the system just described is that the lamp contributing to the brightest areas of the displayed image must be illuminated for relatively long periods of time, and consequently, to obtain a high resolution display, requires vast numbers of lamps which must be pulsed with high currents to obtain useful light levels. Thus, heavy current demands are placed on the power supply. An even greater disadvantage resides in the amount and manufacturing expense of required circuitry and components to enable the display panel to perform its scanning and display functions.

A second solution, such as described in a patent entitled, "Electrical Display Device" U.S. Pat. No. (3,021,387) utilizes electroluminescent phosphor elements in a matrix array wherein the light produced by each of the phosphors is a function of the current therethrough and the current is a function of the video signal level. The video signal is sampled sequentially and stored before being displayed through all the vertical lines and the selected horizontal line simultaneously. This system also requires a great deal of complex equipment for addressing the sampling and storage circuits and the video display matrix via the horizontal switching circuits.

Consequently, in view of the foregoing, it is an object of this invention to provide a flat panel video display device for displaying video signals which may be derived from any appropriate source, such as television, radar, video telephones, computers, etc.

A further object of this invention is to provide such a video device which is capable of performing the necessary sampling and storing and display functions using simpler switching means and lower power requirements than presently available.

A still further object of the invention is to provide a video device adapted for visual display in either black and white or color.

BRIEF DESCRIPTION OF THE INVENTION

The flat panel video display device of the invention provides a simpler means with lower power requirements than presently available for sampling and storing and then displaying video signals. The device consists of a flat, sealed envelope which contains therein chambers filled with an ionizable gas wherein the chambers are exposed to the signal sampling and storage circuits, horizontal line switching circuits and a display matrix of light emitting elements. These all operate on the normal glow discharge characteristics of gases, the principal characteristics being that immediately upon breakdown (ionization) of a gas in an anode-cathode junction so as to produce appreciable current flow, the potential across the ionized gas drops to the glow discharge sustaining voltage (some minimum voltage lower than the breakdown potential which is necessary to maintain current flow) and that the breakdown potential of a gas is lowered when ions and electrons are present in the gas prior to the application of the breakdown potential. Under the conditions of closely spaced multiple anode-cathode junctions, a normal glow discharge can be caused to move from one junction to an adjacent junction by selectively controlling the application of a breakdown potential to the electrodes, provided ions and electrons are free to diffuse from the ionized junctions to adjacent junctions. Glow discharge junctions are utilized in the sampling and storage and horizontal switching circuits of the flat panel video display device.

The video signal is sampled and stored; then during the horizontal blanking period, the stored information is displayed. This is accomplished by sequentially sampling and storing discrete video signal levels for each line in the display matrix and then allowing all of the display junctions for one horizontal line in the matrix to conduct simultaneously. The current through each display junction is governed by the charge developed on individual storage components which is proportional to the video signal level at the moment of sampling. Light emitting elements at the display junctions produce a light the duration and intensity of which is proportional to the current therethrough. If phosphors are used for these light emitting elements, they can be deposited on or near the display junction anodes. A wide choice of phosphor colors make either color or black and white displays feasible with relatively low power requirements.

DESCRIPTION OF THE PREFERRED EMBODIMENT

Figure 1:
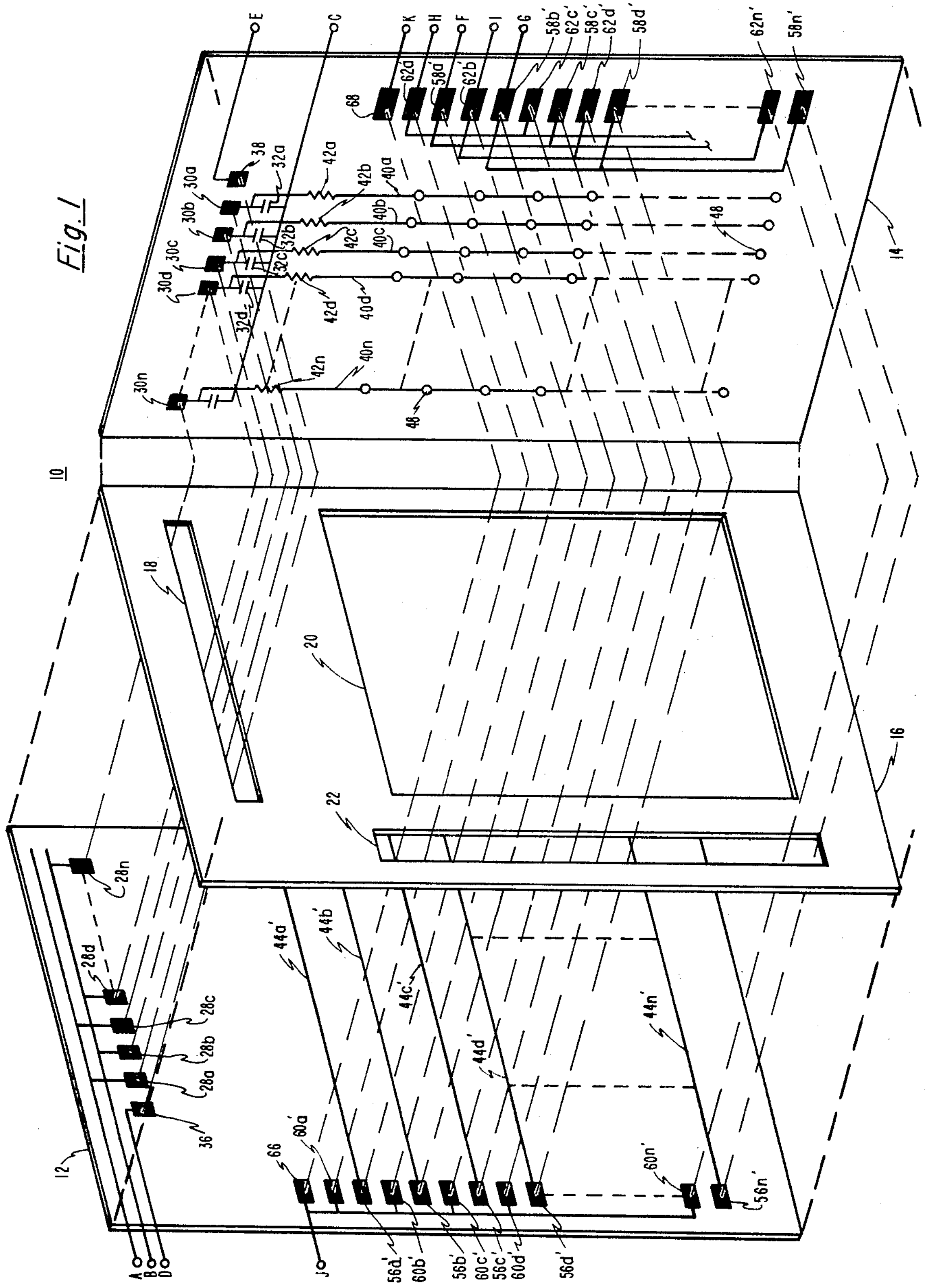
FIG. 1 shows in three dimensional form an exploded schematic view of the flat panel video display device adapted for displaying black and white images.
Figure 2:
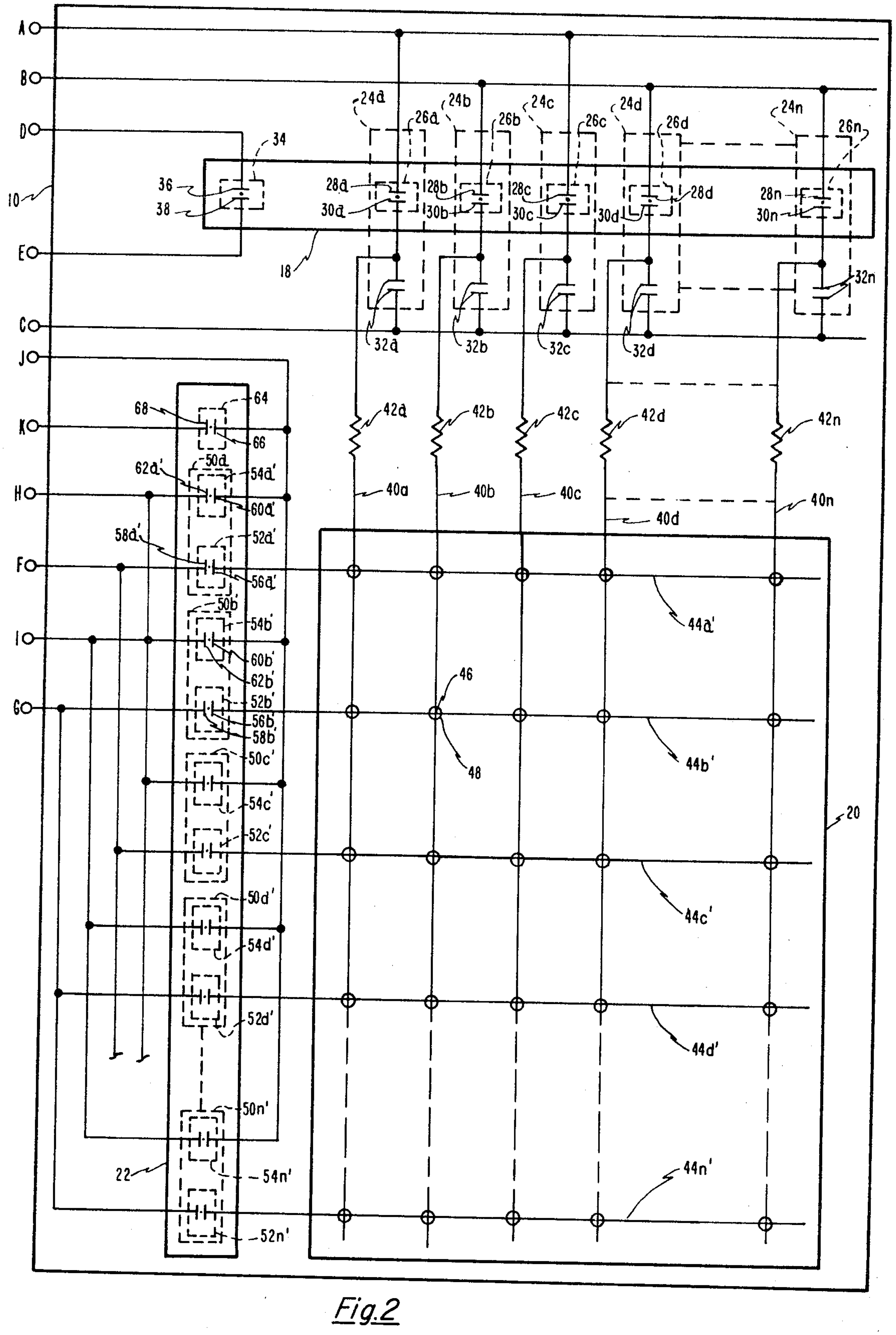
FIG. 2 is a schematic diagram of the device of FIG. 1 as viewed laterally.

Shown in FIG. 1 is a flat panel video display device for reproducing black and white images from video signals. The device is comprised of an envelope 10 formed by two parallel planes 12 and 14 separated by a spacer 16 which is solid except for three openings 18, 20 and 22. These openings provide sealed chambers for accommodating an ionizable gas, such as an inert gas at low pressure, when the planes 12 and 14 are bonded to the spacer 16. The individual components which comprise the various circuits for sampling, storing and displaying the video signal are all formed on the inner surfaces of planes 12 and 14 through any well known process, such as etching, thin film, etc. These circuits are shown in both FIGS. 1 and 2 (the same reference designations being used throughout the figures).

The video signal is sampled and stored before being displayed by a plurality of sampling and storage circuits (**24*a*–24*n*), (FIG. 2), there being n such circuits, each having a sampling junction (26*a*–26*n*) comprising an anode (28*a*–28*n*) and a cathode (30*a*–30*n*) located opposite one another on planes 12 and 14, respectively. It should be noted that the terms anode and cathode are used throughout the specification merely for convenience and that the nomenclature for the two electrodes could be easily interchanged by reversing the polarity of the voltage applied thereto which would not affect the operation of the video display device. The anodes 28 and cathodes 30 are each aligned in a row parallel to the top edge of the envelope 10 so that they are exposed to the opening 18. The anode 28*a* of the first sampling junction 26*a* in the row and the anodes of each of the alternate sampling junctions thereafter are connected to a lead A. The anodes of the remaining sampling junctions are connected to a different lead, namely, B. The signal samples are stored in a plurality of storage capacitors (32*a*–32*n*) located on plane 14, each capacitor 32 being connected between the cathode 30 of a different sampling junction 26** and a common lead C.

A sampling starter junction 34 comprising an anode 36 and a cathode 38 located opposite one another on planes 12 and 14, respectively, and exposed to the opening 18 is located at the beginning of the row of sampling junctions 26 adjacent to the first sampling junction **26*a*. The anode 36 and cathode 38 of starter junction 34 are connected respectively to leads D and E. During operation, an energizing potential is applied continuously across leads D and E so as to maintain the gas between anode 36 and cathode 38 of the starter junction 34 in a continuous state of normal glow ionization. Thus, there are always free ions and electrons present at this junction in the sealed chamber formed by opening 18.**

The operation of the sampling and storage circuits 24 (as well as the horizontal switching circuits to be described subsequently) is based on the normal glow discharge characteristics of gases wherein the energizing potential necessary to break down (ionize) a gas enclosed between a pair of electrodes to produce an appreciable current flow therethrough is reduced whenever there are free ions and electrons in the gas prior to the application of the energizing potential and that upon breakdown, the potential across the enclosed gas drops to the glow discharge sustaining voltage. If pairs of electrodes, each pair defining a junction, are placed closely next to one another in a row exposed to a sealed chamber containing an ionizable gas in which ions and electrons are free to move about, the junctions may be sequentially ionized by alternately applying to alternate electrode pairs an energizing potential high enough to break down the gas. For instance, if such an energizing potential is applied in series with the video signal or in series with a current limiting variable impedance (not shown) which is a function of the video signal across leads A and C, junction **26*a* will break down first since there are more free ions and electrons in proximity thereto than any other junction, junction 26*a* being adjacent to the starter sampling junction 34 wherein free ions and electrons are abundantly present. If the video signal is applied to the base of a transistor, for example, the collector emitter path of the transistor provides the current limiting variable impedance. No other sampling junction will break down after junction 26*a* at this time; the sampling junctions with anodes connected to lead B cannot since there is no energizing potential present on this lead and the other sampling junctions with anodes connected to lead A cannot because the voltage across leads A and C drops below the required breakdown potential after junction 26*a* breaks down, the voltage being equal to the glow discharge sustaining voltage plus the capacitor 32*a* voltage. Because of the time constant selected for charging the capacitors 32, the sum of the capacitor 32*a*** voltage and sustaining voltage never exceeds the required breakdown potential before the energizing potential is removed.

When the energizing potential (via the current limiting variable impedance) is removed from lead A and applied across leads B and C, sampling junction **26*b* breaks down due to the presence of free ions and electrons from sampling junction 26*a*, there being more free ions and electrons at this junction than in any other junction following. No other sampling junction breaks down at this time for the reasons previously stated. When the energizing potential is removed from lead B and again applied across leads A and C, only sampling junction 26*c* breaks down. Sampling junction 26*a* cannot breakdown again since the potential across this junction is not high enough to produce breakdown. This is so because before sampling junction 26*c* breaks down, the potential across sampling junction 26*a* is equal to the energizing potential less the voltage developed across the plates of capacitor 32*a* by the current conduction therethrough when junction 26*a* was initially ionized and the minimum voltage which the capacitors 32 are designed to achieve with a minimum video signal level (corresponding to minimum illumination) is such as to always prevent breakdown of a sampling junction 26 while its associated capacitor 32 is charged. Thus, only one sampling junction 26 is enabled at a time. By alternately applying the energizing potential to leads A and B, the sampling junctions 26 are ionized in sequence beginning with junction 26*a* and terminating with junction 26*n*, the application of the energizing potential being synchronized with the video signal. As each sampling junction 26 is ionized and enabled to pass current, a charge is placed on the plates of its associated capacitor 32 which is proportional to the video signal level at the time of ionization because of the varying impedance in series with the energizing potential. Since the sampling junctions 26 are sequentially enabled, the sampling and storage circuits 24 sequentially sample the video signal, each capacitor 32 therein developing a charge representative of the video signal level at the moment the sample is taken. The charge on each capacitor 32 is stored until the last sample is taken for capacitor 32***n* through sampling junction 26*n*. Thereafter, all the capacitors 32 are permitted to discharge simultaneously through light emitting elements, thereby providing a visual display of the signal just sampled.

The discharge takes place through a plurality of vertical conductors (40*a*–40*n*), each being connected to the cathode 30 of a different sampling junction 26 through an individual current limiting resistor (42*a*–42*n*). The vertical conductors 40 are arranged in close parallel array on plane 14 parallel to a side edge of envelope 10. A plurality of horizontal conductors (44*a'*–44*n'*) are arranged in close parallel array on plane 12 parallel to the top edge of envelope 10, there being *n'* such conductors. Each vertical conductor 40 crosses each horizontal conductor 44 producing a display matrix so that if viewed laterally as in FIG. 2, each matrix crosspoint defines a display junction 46 comprising a light emitting element which produces light when energized by an electric current passing therethrough, the duration and intensity of the light being proportional to the magnitude of charge on the associated capacitor 32. Selected phosphors 48 coated on top of the vertical conductors 40 which are transparent (or the horizontal conductors 44 if they constitute the anodes) at each display junction 46 are quite suited for this purpose.

The vertical and horizontal conductors of the display matrix are exposed to the opening 20 of the spacer 16. Although opening 20 is shown as one entire sealed chamber, it could be formed with a plurality of sealed chambers, there being one separate sealed chamber for each display junction (bubble-type) of the display matrix or one sealed chamber for each horizontal line of display junctions, or any combination thereof. The selection depends on the strength desired for the envelope 10 and the cost one is willing to spend to achieve it. To discharge the capacitors 32 after each sampling operation, an energizing potential is applied across a particular horizontal conductor, such as 44*a'* and lead C, which develops a sufficient potential across the vertical conductors 40 and the horizontal conductor (44*a'*) to break down the display junctions along that particular horizontal conductor (44*a'*). With the enclosed gas at the enabled display junctions ionized, charge flows from the capacitors 32 through the vertical conductors 40 and the horizontal conductor (44*a'*) causing each of the light emitting elements at the display junctions along that line to produce a light which is a function of the current therethrough. Since the magnitude and duration of the current through each display junction is a function of the charge on the capacitor 32 to which the associated vertical conductor 40 is connected and since the charge is a function of the video signal level when sampled, the light produced at each display junction is representative of that signal level.

The discrete samples for each sampling operation are obtained sequentially but are displayed simultaneously for each horizontal line, the line being selected by the horizontal conductor 44 which is enabled. The horizontal conductors 44 are sequentially enabled by a plurality of horizontal switching circuits (50*a'*–50*n'*), each consisting of a horizontal line junction (52*a'*–52*n'*) and a horizontal line guide junction (54*a'*–54*n'*). Each horizontal line junction 52 comprises an anode (56*a'*–56*n'*) and a cathode (58*a'*–58*n'*) located opposite each other on planes 12 and 14, respectively, arranged so that they are exposed to the sealed chamber formed by opening 22. The anodes 56 and cathodes 58 are each aligned in a row along a side edge of the envelope 10 with each consecutive anode 56 being connected to a different horizontal conductor 44 in consecutive order. The cathode 58*a'* of the first horizontal line junction 52*a'* and the cathodes of the alternate horizontal line junctions thereafter are connected to a lead F. The cathodes of the remaining horizontal line junctions are connected to another lead G.

Each horizontal line guide junction 54 comprises an anode (60*a'*–60*n'*) and a cathode (62*a'*–62*n'*) located opposite each other on the planes 12 and 14, respectively, arranged so that they are also exposed to the opening 22. The anode 60 and cathode 62 of each horizontal line guide junction 54 are respectively located adjacent to and just above the anode 56 and cathode 58 of an associated horizontal line junction 52. The cathode 62*a'* of the first horizontal line guide junction 54*a'* and the cathodes of the alternate horizontal line guide junctions thereafter are connected to a lead H while the cathodes of the remaining horizontal line junctions are connected to another lead I. The anodes 56 of all the horizontal line guide junctions 54 are connected in common to a lead J.

The horizontal switching circuits 50 operate on the same normal glow discharge principles as the sampling and storage circuits 24. A display starter junction 64 comprising an anode 66 and a cathode 68 located opposite one another on the planes 12 and 14, respectively, and exposed to the opening 22 is located at the top of the row of horizontal switching circuits 50 adjacent to horizontal line guide junction 54*a'*. The anode 66 is connected to lead J while the cathode 68 is connected to a lead K. An energizing potential is applied across leads J and K to initiate the video display along the top line of the display matrix via horizontal conductor 44*a'*. This breaks down the display starter junction 64 ionizing the gas therein, thus, making available free ions and electrons to begin the display operation along the top horizontal line. The energizing potential is applied across leads J and K until the first sampling operation is completed (corresponding to the signal to be displayed on the top horizontal line). During this sampling operation, an energizing potential is also applied across leads J and H, which causes the first horizontal line guide junction 54*a'* to break down in the presence of free ions and electrons from the display starter junction 64. No other junction breaks down at this time as explained earlier. At the completion of this sampling operation, the energizing potentials applied across leads J and H and J and K are removed and an energizing potential is applied across leads C and F causing horizontal line junction 52*a'* to break down, thus, enabling the capacitors 32 to discharge through the display junctions along the horizontal conductor 44*a'* and then through this conductor 44*a'* which is in series with the enabled horizontal line junction 52*a'*.

When the display operation via horizontal conductor 44*a'* is completed and the next sampling operation is to begin the energizing potential applied across leads C and F is removed and is applied across leads I and J, thereby breaking down horizontal line guide junction 54$b'$ and freeing ions and electrons in the immediate vicinity of horizontal line junction 52$b'$ which prepares it for the next dispaly operation. When the display is to be made, the energizing potential is applied across leads C and G which breaks down horizontal line junction 52$b'$ permitting the capacitors 32 to once again discharge, this time through horizontal conductor 44$b'$.

By alternately applying an energizing potential across lead J and leads H and I for breaking down the horizontal line guide junction 54 and across lead C and leads F and G for breaking down the horizontal line junctions 52, the group of video signal samples are sequentially displayed along the horizontal lines of the display matrix via the sequentially enabled horizontal conductors 44. After the signal is displayed along the bottom horizontal line via horizontal conductor 44$n'$, the discharge sequence is repeated by again first applying the energizing potential across leads J and K to once again break down the display starter junction 64.

Figure 3:
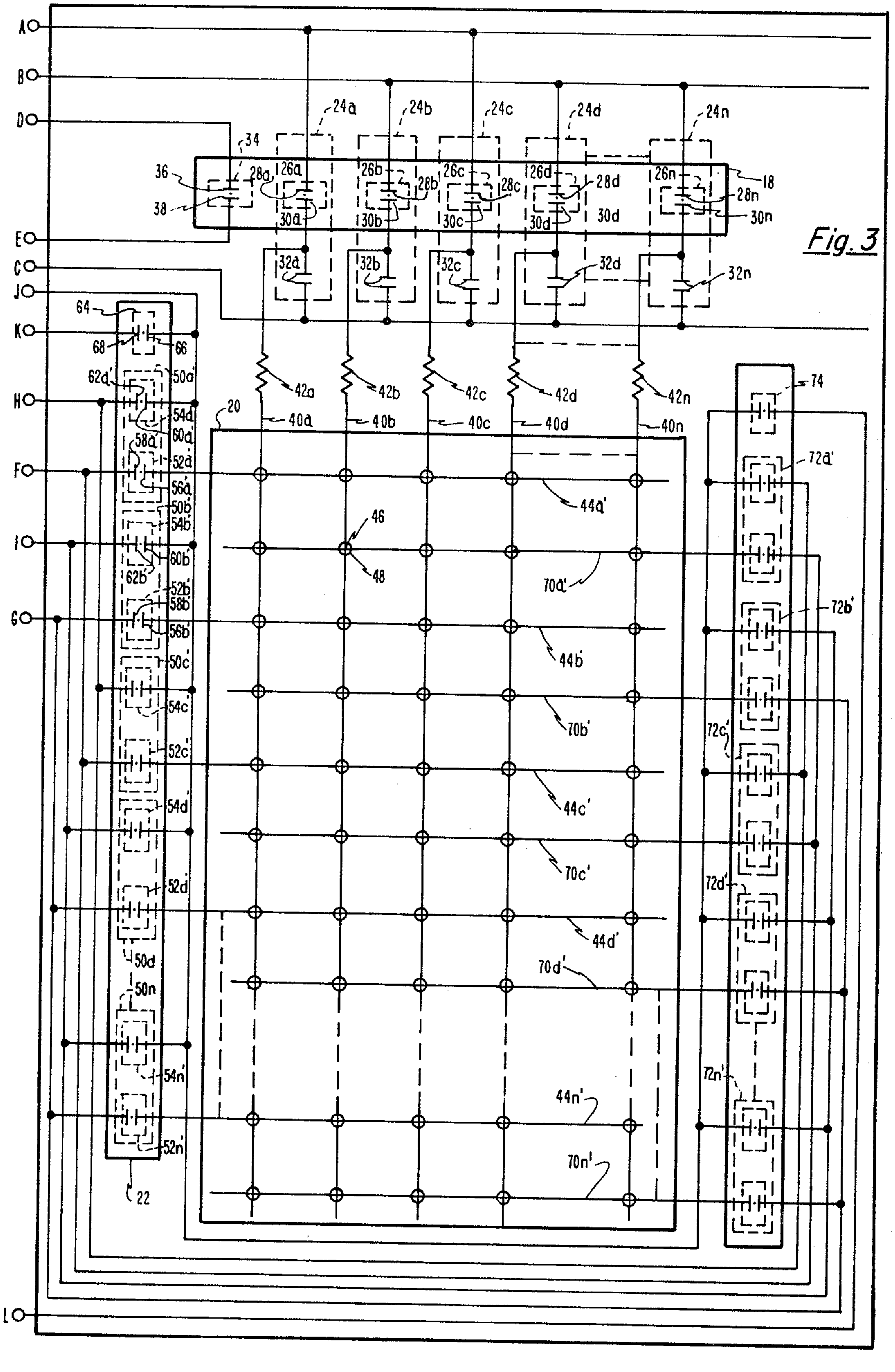
FIG. 3 represents FIG. 2 as modified to provide for interlace scanning of the video signal.

If interlace scanning (sequentially displaying the video signal through a first set of horizontal conductors followed by a sequential display through a second set of horizontal conductors wherein the first and second set of conductors are alternately placed with respect to one another) is desired, then a second group of horizontal conductors (70$a'$–70$n'$) and horizontal switching circuits (72$a'$–72$n'$) and a second display starter junction 74 can be provided along the other side edge of the envelope 10 as shown in FIG. 3. Only one additional lead L to the cathode of the second display starter junction 74 is required so that energizing potential may be applied first across leads J and K to initiate a first discharge sequence via the first set of horizotnal conductors 44 and then across leads J and L to initiate a second discharge sequence via the second set of horizontal conductors 70 and continually repeating the same. The second set of horizontal switching circuits 72 are connected to the leads the same as the first set of horizontal switching circuits 50 and the energizing potentials with the exception of the foregoing are applied the same as previously described. The application of the energizing potential to the first or second display starter junction determines which set of horizontal lines is to be used for display purposes.

Figure 4:
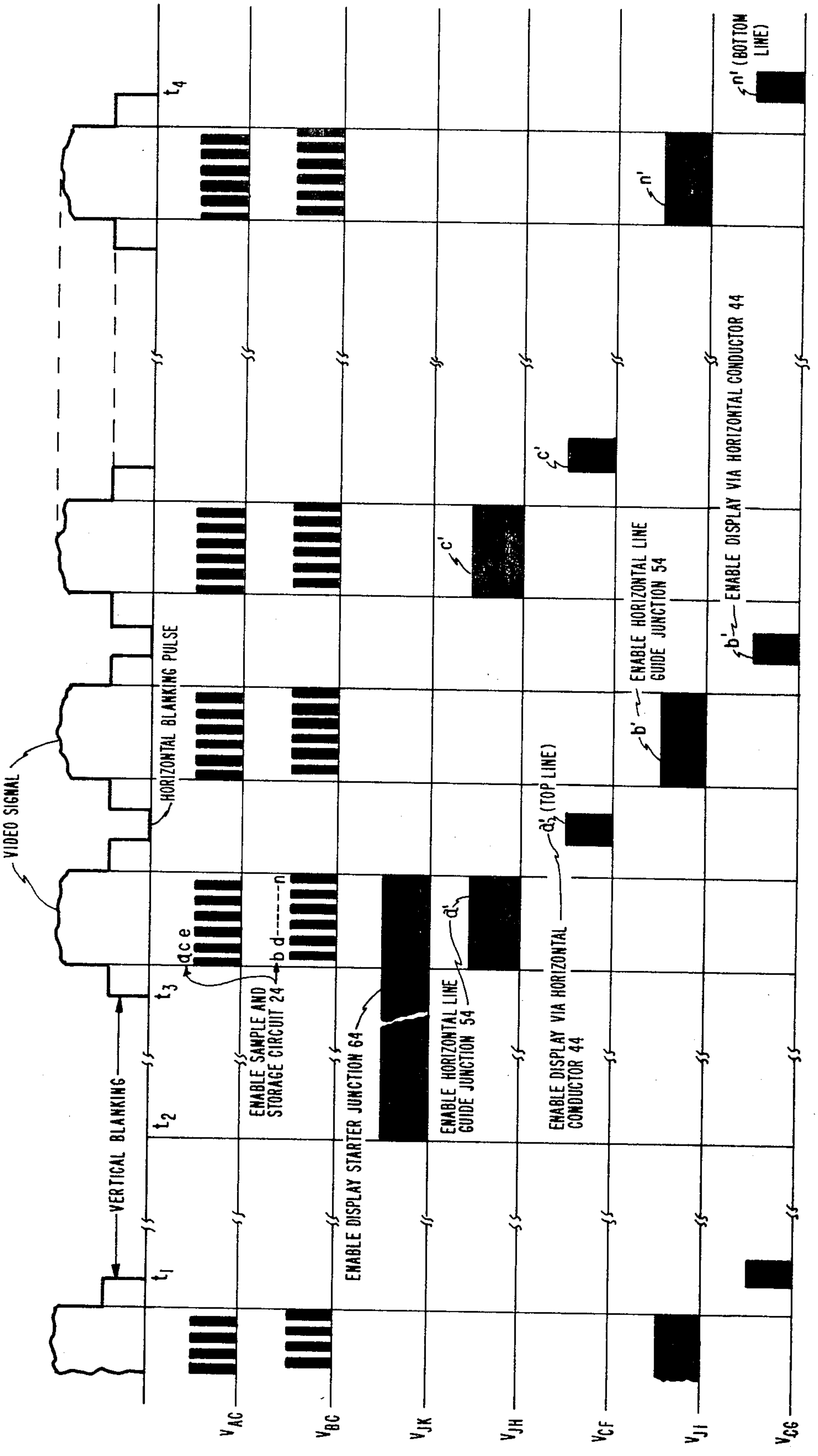
FIG. 4 illustrates a typical video signal waveform and the energizing potential waveforms derived therefrom for operating the video display.

For the flat panel video display device to function properly, the various energizing potentials, through well known and commonly utilized techniques, must be derived from and synchronized with the video signal to be sampled and displayed. The waveforms for these energizing potentials are shown in FIG. 4, the time sequence being related to a standard RETMA waveform which includes the video signal and which is shown at the top of the drawing. Each energizing potential waveform is applied across a pair of leads of envelope 10 designated by the subscripts of the V next to the waveform such that the potential is positive when measured from the first subscript lead to the second subscript lead. It should be remembered that $V_{AC}$ and $V_{BC}$ are applied through a current limiting variable impedance which is a function of the video signal so that the current therethrough follows the video signal when plotted against time. The illustrated waveforms for the energizing potentials are intended to indicate the breakdown sequence and timing relationship for the various junctions and are not to be construed as being indicative of any relative degree of wave amplitude. In other words, the sizes indicated are not comparative and are used only for the purpose of illustrating the ionization sequences.

The video signal and the associated energizing potential waveforms are representative of one complete discharge sequence, including the sampling operations beginning at time $t_1$, for the video signal. The vertical blanking period between times $t_1$ and $t_3$ represents the equalizing and synchronizing pulses (not shown) which prepares the video signal receiver for displaying the video signal along the top horizontal line of the display matrix (beginning at $t_3$) after each display of the video signal is completed along the bottom horizontal line (ending at $t_1$). The energizing potential $V_{JK}$ to break down the display starter junction 64 is applied across leads J and K at time $t_2$, coincident with the vertical synchronizing pulse (not shown). The number of energizing pulses applied across lead C and leads A and B during each sampling operation depends, of course, on the number of display junctions along a horizontal line required for the desired resolution. The energizing potential for discharging the capacitors 32 to display the video signal is alternately applied across lead C and leads F and G coincident with the horizontal blanking pulses of the video signal. The energizing potential for preparing the horizontal line junctions 52 to breakdown to display the video signal is alternately applied across lead J and leads H and I, coincident with the video signal pulses. When the video signal is displayed along the bottom line of the display matrix via the last horizontal conductor 44$n'$, the energizing potential waveforms are repeated as shown. If interlace scanning is utilized, then the next discharge sequence is performed via horizontal conductors 70 rather than horizontal conductors 44 by applying the energizing potential to display starter junction 74 via leads J and L rather than to display starter junction 64 via leads J and K.

Figure 5:
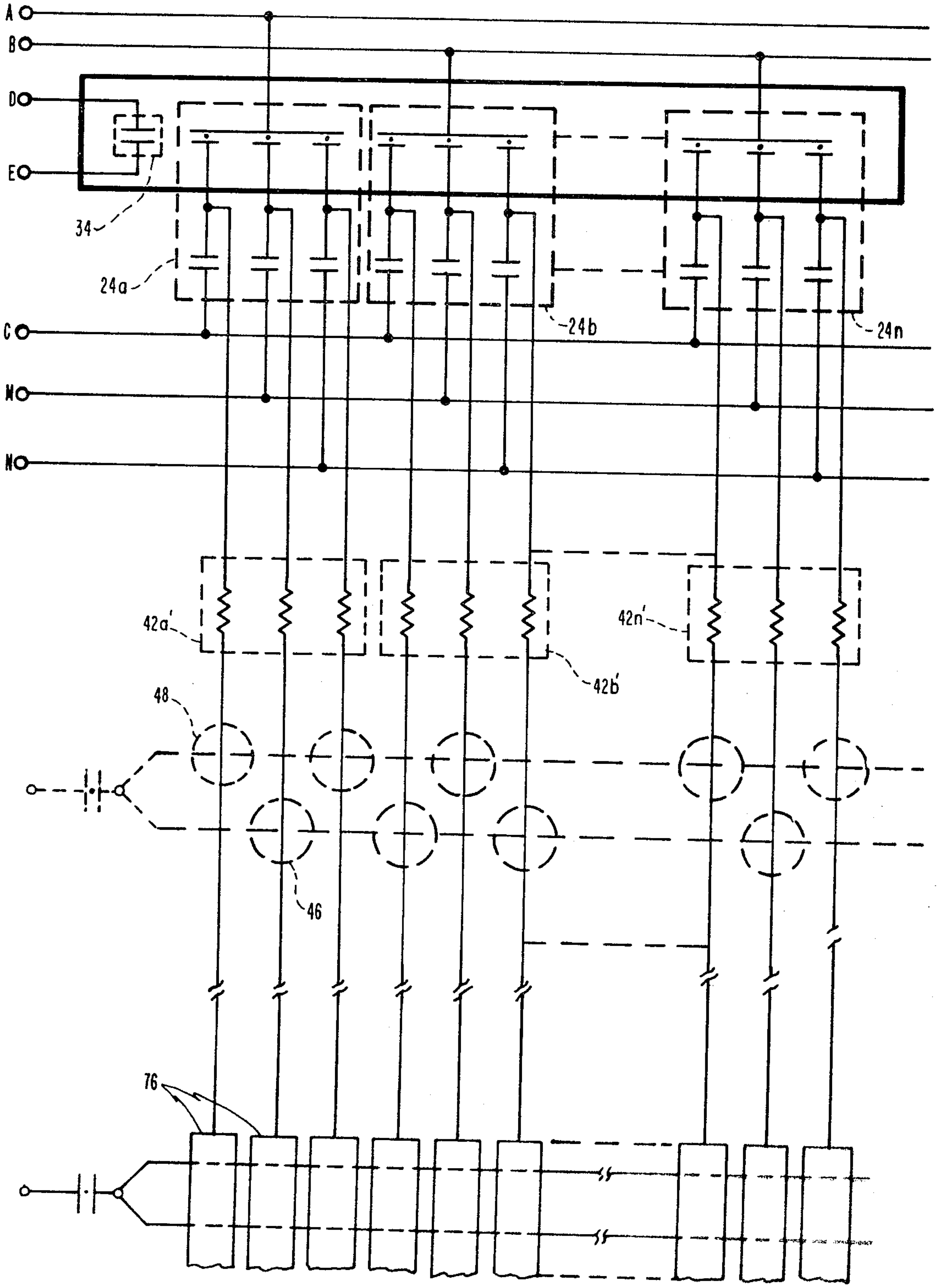
FIG. 5 shows the modifications necessary to the schematic diagram of FIG. 2 to provide color picture displays of the video signal.

Referring now to FIG. 5, which illustrates the modifications to the black and white image flat panel display to enable reproduction of color images, it is seen that the signals for the primary colors of red, blue and green require three individual video input leads (M and N, in addition to C). Also, three times the number of vertical lines, current limiting resistors and storage capacitors are required for resolution comparable to a black and white display. A cathode for each of the three colors and a single anode constitute a sampling junction. The three color signals are sampled simultaneously. Although color triads consisting of phosphor dots 48 for each of the three colors could be utilized for the color display, the alternating phosphor stripes 76 as shown in FIG. 5 are preferred. Operation of the color flat panel display, with the exceptions noted above, is the same as for the black and white flat panel display.

The flat panel video display device can be constructed utilizing well known techniques. When interlace scanning is utilized with black and white displays, twelve terminals are provided for connection to the sampling, storage and horizontal switching circuits contained within the envelope 10. The particular embodiment described herein is in no way intended to limit the physical configuration of the video display device since this could be changed in a number of ways without detracting from the spirit and scope of the invention.

The video signal sampling and storing apparatus described here could be employed with other types of light emitting elements. These elements, such as light-emitting diodes, electroliminescent junctions, liquid crystals or others in a matrix array could be controlled by the charged storage capacitors 32 to provide the display function in a flat panel.

In summary, the present invention provides a new and novel flat panel video display device for reproducing images, derived from suitable video signals. The use of glow discharge gas junctions for sequential switching operations necessary to sample and store and then display the video signal simplifies the required equipment and reduces the power requirements over prior art devices. This device further provides the option of black and white or color presentation.

What is claimed is:

1. A flat panel video display device for reproducing images from video signals comprising:

a plurality of sampling and storage circuits, each having a sampling junction, the sampling junctions being aligned in a row, with each comprising two electrodes located opposite one another in a pair of parallel planes, separated by an ionizable gas;

video signal means for applying the video signal to said plurality of sampling and storage circuits;

first glow discharge means synchronized with the video signal for enabling said sampling and storage circuits to sequentially sample the video signal applied via said video signal means and to individually develop a charge proportional to the video signal level at the time of sampling;

a display matrix formed by a first plurality of conductors arranged in spaced parallel array in a first one of said parallel planes, each of said first plurality of conductors being connected to a different one of said sampling and storage circuits, and a second plurality of conductors arranged in spaced parallel array in the second one of said parallel planes wherein said first and second plurality of conductors all cross one another in traverse directions;

conducting means separating said first and second plurality of conductors at their crosspoints which define display junctions for conducting current when a mininum preset voltage is applied thereto, and second glow discharge means synchornized with the video signal for sequentially enabling each of said second plurality of conductors to discharge said plurality of sampling and storage circuits via said first plurality of conductors after each sampling operation is completed, said discharge sequence always being initiated with a preselected one of said second plurality of conductors.

2. The flat panel video display device of claim 1 wherein said first glow discharge means includes means for applying to said sampling junctions an energizing potential for sequentially ionizing each sampling junction in the presence of free ions and electrons from the adjacent sampling junction previously ionized.

3. The flat panel video display device of claim 2 wherein said first glow discharge means includes a sampling starter junction located at the beginning of the row of sampling junctions comprising two electrodes located opposite one another in said first and second planes, separated by said ionizable gas, said sampling starter junction being continuously energized for maintaining the gas in contact with the electrodes thereof in a continuous state of ionization.

4. The flat panel video display device of claim 3 wherein each of said sampling and storage circuits includes a capacitor connected between a first of said two electrodes of its associated sampling junction and a first common lead connected to said video signal means so that said capacitor develops a charge proportional to the video signal level whenever its associated sampling junction is ionized.

5. The flat panel video display device of claim 4 wherein the second ones of said two electrodes of alternate sampling junctions are connected to a first lead and the second ones of said two electrodes of the remaining sampling junctions are connected to a second lead and said energizing potential is applied to said video signal means and alternately to said first and second leads to sequentially ionize each sampling junction to enable its associated capacitor to become charged to a voltage proportional to the video signal level at the time of sampling, the minimum voltage developed across the capacitor being such as to prevent the sampling junction from being ionized a second time before its associated capacitor is discharged.

6. The flat panel video display device of claim 1 wherein said second glow discharge means includes a plurality of line junctions aligned in a row, each comprising two electrodes located opposite one another in said first and second planes, separated by a second ionizable gas, each consecutive one of said line junctions having a first one of said two electrodes connected to a separate one of said second plurality of conductors in consecutive order.

7. The flat panel video display device of claim 6 wherein said second glow discharge means includes a plurality of line guide junctions, each being located just ahead of a different one of said line junctions and each comprising two electrodes located opposite one another in said first and second planes, separated by said second ionizable gas wherein first ones of said two electrodes of said line guide junctions are connected to a second common lead and the second ones of said two electrodes of alternate line guide junctions are connected to a third lead and the second ones of said two electrodes of the remaining line guide junctions are connected to a fourth lead.

8. The flat panel video display device of claim 7 wherein said second glow discharge means includes means for alternately applying an energizing potential between said second common lead and said third and fourth leads, said energizing potential being applied during each sampling operation.

9. The flat panel video display device of claim 8 wherein said second glow discharge means includes means for applying to said line junctions an energizing potential for ionizing each line junction sequentially in the presence of free ions and electrons from the adjacent line guide junction previously ionized.

10. The flat panel video display device of claim 9 wherein the second ones of said two electrodes of alternate line junctions are connected to a fifth lead and the second ones of said two electrodes of the remaining line junctions are connected to a sixth lead and said energizing potential is alternately applied between said first common lead and said fifth and sixth leads after the completion of each sampling operation.

11. The flat panel video display device of claim 10 wherein said second glow discharge means includes a display starter junction located just ahead of the first line guide junction in the row of line junctions comprising two electrodes located opposite one another in said first and second planes, separated by said second ionizable gas for receiving an energizing potential to initiate each discharge sequence with the preselected one of said second plurality of conductors.

12. The flat panel video display device of claim 10 including a third plurality of conductors interlaced between said second plurality of conductors, connected to a third glow discharge means comprising a second set of line junctions and line guide junctions and a second display starter junction arranged in similar fashion to that of said second glow discharge means whereby an energizing potential is applied to said display starter junction to initiate the sequential discharge of said storage capacitors through said second plurality of conductors and the energizing potential is then applied to said second display starter junction for sequentially discharging said storage capacitors through said third plurality of conductors and then repeating the same.

13. The flat panel video display device of claim 1 wherein said conducting means comprises a third ionizable gas.

14. The flat panel video display device of claim 13 wherein said third ionizable gas is enclosed in a plurality of sealed chambers, each of said sealed chambers being exposed to a group of display junctions along a different one of said second plurality of conductors.

15. The flat panel video display device of claim 13 wherein said third ionizable gas is enclosed in a plurality of sealed bubbles, each of said bubbles being exposed to a different one of said display junctions.

16. The flat panel video dispay device of claim 1 wherein said light emitting means consists of a plurality of phosphors, a separate one located at each of said dislay junctions between said first and second plurality of conductors.

17. A flat panel video display device for reproducing black and white displays from video signals comprising:

an enclosure having two parallel planes;

a plurality of sampling junctions aligned in a row, each having first and second electrodes located opposite one another on the inner surfaces of said two parallel planes;

a first ionizable gas separating the first and second electrodes of said sampling junctions;

a first lead connected in common to the first electrode of alternate sampling junctions;

a second lead connected in common to the first electrode of the remaining sampling junctions;

a sampling starter junction located at the beginning of the row of sampling junctions comprising two electrodes located opposite one another on the inner surfaces of said parallel planes separated by said first ionizable gas;

third and fourth leads connected to the two electrodes of said sampling starter junction;

a fifth lead;

a plurality of capacitors, one for each of said sampling junctions connected between the second electrode of its associated sampling junction and said fifth lead;

a first plurality of conductors arranged in spaced parallel array on the inner surface of one of said two parallel planes, each of said first plurality of conductors being connected through an individual resistor to the second electrode of a different sampling junction;

a second plurality of conductors arranged in spaced parallel array on the inner surface of the other of said two parallel planes so that each of said first and second plurality of conductors all cross one another in transverse directions;

a second ionizable gas separating said first and second plurality of conductors;

a plurality of line junctions aligned in a row, each comprising first and second electrodes located opposite one another on the inner surfaces of said two parallel planes, the first electrode of each consecutive line junction being connected to a consecutive one of said second plurality of conductors;

a third ionizable gas separating the first and second electrodes of said line junctions;

a sixth lead connected in common to the second electrodes of alternate line junctions;

a seventh lead connected in common to the second electrodes of the remaining line junctions;

a plurality of line guide junctions, each located just ahead of a different one of said line junctions and each comprising first and second electrodes located opposite one another on the inner surfaces of said two parallel planes separated by said third ionizable gas;

an eighth lead connected in common to the first electrode of alternate line guide junctions;

a ninth lead connected in common to the first electrode of the remaining line guide junctions;

a tenth lead connected in common to the second electrodes of said line guide junctions;

a display starter junction located next to the first line guide junction in the row of line junctions comprising two electrodes located opposite one another on the inner surfaces of said two parallel planes separated by said third ionizable gas;

eleventh and twelfth leads connected to the two electrodes of said display starter junction, and a plurality of phosphors, each being located between said first and second plurality of conductors at a different one of their crosspoints.

18. A flat panel video display device for reproducing color displays from video signals comprising:

an enclosure having two parallel planes;

a plurality of sampling junctions aligned in a row, each having a first electrode located opposite a group of three electrodes on the inner surfaces of said parallel planes;

a first ionizable gas between said two parallel planes separating the first electrode and group of three electrodes of said sampling junctions;

a first lead connected in common to the first electrodes of alternate sampling junctions;

a second lead connected in common to the first electrodes of the remaining sampling junctions;

a sampling starter junction located at the beginning of the row of sampling junctions comprising two electrodes located opposite one another on the inner surfaces of said parallel planes separated by said first ionizable gas;

third and fourth leads connected to the electrodes of said sampling starter junction;

fifth, sixth and seventh leads;

a plurality of capacitors, there being three capacitors for each of said sampling junctions, each of said three capacitors being connected between a different one of said three electrodes of its associated sampling junction and a different one of said fifth, sixth and seventh leads;

a first plurality of conductors arranged in spaced parallel array on the inner surface of one of said two parallel planes, there being three conductors for each of said sampling junctions, each of said three conductors being connected through an individual resistor to a different one of said three electrodes of its associated sampling junction;

a second plurality of conductors arranged in spaced parallel array on the inner surface of the other of two parallel planes so that each of said first and second plurality of conductors all cross each other in transverse directions;

a second ionizable gas separating said first and second plurality of conductors;

a plurality of line junctions aligned in a row, each comprising first and second electrodes located opposite one another on the inner surfaces of said parallel planes, the first electrode of each consecutive line junction being connected to a consecutive one of said second plurality of conductors;

a third ionizable gas separating the first and second electrodes of said line junctions;

an eighth lead connected in common to the second electrodes of alternate line junctions;

a ninth lead connected in common to the second electrodes of the remaining line junctions;

a plurality of line guide junctions, each located just ahead of a different one of said line junctions and each comprising first and second electrodes located opposite one another on the inner surfaces of two parallel planes separated by said third ionizable gas;

a tenth lead connected in common to the first electrode of alternate line guide junctions;

an eleventh lead connected in common to the first electrode of the remaining line guide junctions;

a twelfth lead connected in common to the second electrodes of said line guide junctions;

a display starter junction located next to the first line guide junction in the row of line junctions comprising two electrodes located opposite one another on the inner surfaces of said two parallel planes separated by said third ionizable gas;

thirteenth and fourteenth leads connected to the two electrodes of said display starter junction; and a plurality of color phosphors located between said first and second plurality of conductors, there being three different primary color phosphors, each located at one of the three crosspoints where each three of said first plurality of conductors connected to the same sampling junction cross each of said first plurality of conductors.

* * * * *